US012508638B2

(12) United States Patent
West

(10) Patent No.: US 12,508,638 B2
(45) Date of Patent: Dec. 30, 2025

(54) METHOD OF MAKING A FLUID CONDUIT

(71) Applicant: Subsea 7 Limited, Sutton (GB)

(72) Inventor: Trevor West, Inverurie (GB)

(73) Assignee: SUBSEA 7 LIMITED, Sutton (GB)

( * ) Notice: Subject to any disclaimer, the term of this patent is extended or adjusted under 35 U.S.C. 154(b) by 446 days.

(21) Appl. No.: 17/631,869

(22) PCT Filed: Aug. 3, 2020

(86) PCT No.: PCT/GB2020/051861
§ 371 (c)(1),
(2) Date: Jan. 31, 2022

(87) PCT Pub. No.: WO2021/019260
PCT Pub. Date: Feb. 4, 2021

(65) Prior Publication Data

US 2022/0280991 A1 Sep. 8, 2022

(30) Foreign Application Priority Data

Aug. 1, 2019 (GB) ..................................... 1911021

(51) Int. Cl.
*B21D 22/16* (2006.01)
*B23K 26/00* (2014.01)
*E21B 17/20* (2006.01)

(52) U.S. Cl.
CPC .......... *B21D 22/16* (2013.01); *B23K 26/0093* (2013.01); *E21B 17/203* (2013.01); *E21B 17/206* (2013.01)

(58) Field of Classification Search
None
See application file for complete search history.

(56) References Cited

U.S. PATENT DOCUMENTS 3,843,170 A 10/1974 Bagnulo
8,351,835 B2 * 1/2013 Maruyama ......... G03G 15/2053 72/85
(Continued)

FOREIGN PATENT DOCUMENTS

CN 101954401 A 1/2011
CN 104028598 A 9/2014
(Continued)

OTHER PUBLICATIONS

Toto et al., "Process Parameters on Quality of Cold Spinned Head Tube", Applied Mechanics & Materials, 2013, (Year: 2013).*
(Continued)

*Primary Examiner* — Devang R Patel
(74) *Attorney, Agent, or Firm* — MATTINGLY & MALUR, PC

(57) ABSTRACT

A method of making a fluid conduit includes at least one tubular metal fitting in fluid communication with metal tubing. The conduit is apt to be incorporated into a subsea umbilical. The fitting is made by cold-forming a workpiece in a spinning operation. The workpiece material initially has a yield strength below that of the tubing material. The invention corrects or reduces this mismatch between the yield strength of the tubing material and the initial yield strength of the workpiece material by: assessing the yield strength of the tubing material; assessing the increased yield strength of the workpiece material by virtue of the spinning operation; and before welding the fitting to the tubing, comparing the increased yield strength of the workpiece material with the yield strength of the tubing material.

13 Claims, 5 Drawing Sheets

(56) References Cited

U.S. PATENT DOCUMENTS

| | | | |
|---|---|---|---|
| 9,038,428 B2 | 5/2015 | Novitsky et al. | |
| 9,343,199 B2 * | 5/2016 | Fogg | H01B 7/046 |
| 10,738,371 B2 * | 8/2020 | Ishitsuka | C22C 38/002 |
| 11,014,181 B2 | 5/2021 | Kim et al. | |
| 2001/0054822 A1 | 12/2001 | Pakker | |
| 2007/0059460 A1 | 3/2007 | Abney et al. | |
| 2010/0163544 A1 * | 7/2010 | Shirai | G03G 15/2053 219/216 |
| 2015/0361728 A1 * | 12/2015 | Chen | B21D 22/16 166/242.6 |
| 2016/0033059 A1 | 2/2016 | Fonte | |
| 2016/0111183 A1 | 4/2016 | Mast | |
| 2018/0216416 A1 | 8/2018 | Ethridge et al. | |
| 2021/0293359 A1 | 9/2021 | Kim et al. | |
| 2022/0062967 A1 * | 3/2022 | López | B21D 22/16 |

FOREIGN PATENT DOCUMENTS

| | | |
|---|---|---|
| CN | 104858284 A | 8/2015 |
| CN | 106583493 A | 4/2017 |
| JP | 11-342429 A | 12/1999 |
| JP | 2000-061570 A | 2/2000 |
| JP | 2006-212670 A | 8/2006 |
| TW | 201521898 A | 6/2015 |
| WO | WO 2011/045582 | 4/2011 |
| WO | WO 2013/033134 | 3/2013 |
| WO | WO 2015/200325 | 12/2015 |
| WO | 2016/062681 A1 | 4/2016 |
| WO | WO 2016/061235 | 4/2016 |
| WO | WO 2018/052311 | 3/2018 |
| WO | WO 2018/148718 | 8/2018 |

OTHER PUBLICATIONS

Lee et al., "Analysis and Estimation of the Yield Strength of API X70 and X80 Linepipe Steels", Metals and Materials International, vol. 19, 2013, p. 377-388 (Year: 2013).*

American Society for Testing and Materials Standard Specification A815 and A815/A815M-18, "Standard Specification for Wrought Ferritic, Ferritic/Austenitic, and Martensitic Stainless Steel Piping Fittings".

Japanese Office Action received in corresponding Japanese Application No. 2022-506722 dated May 28, 2024.

Chinese Office Action received in corresponding Chinese Application No. 202080056044.X dated Jun. 17, 2024.

Forming Characteristics of Cu/Al Bimetal Tube Spinning; Yuan Qi-wei, et al., Journal of Netshape Forming Engineering, vol. 10, Jul. 2018.

* cited by examiner

METHOD OF MAKING A FLUID CONDUIT

This invention relates to the incorporation of metal fittings into lengths of metal tubing. The invention is particularly concerned with the manufacture of fluid conduits that comprise such fittings and tubing, for example as may be used in umbilicals in the subsea oil and gas industry. In such applications, the inventors have identified a benefit in modifying the mechanical properties of a fitting that is to be welded to tubing, especially where the applicable standards require both the fitting and the tubing to be of the same material grade.

A subsea umbilical comprises an elongate body that extends between the surface of the sea and a subsea installation on the seabed, or between items of equipment at mutually-spaced subsea locations. In addition to electrical power and control signals, an integrated umbilical supplies service fluids such as: oil for hydraulic control of valves; hydrate inhibitors and other chemicals for flow assurance; and remediation fluids such as dead oil or methanol. A typical integrated umbilical also provides for data communication, for example via optical fibres.

WO 2011/045582 exemplifies an umbilical. WO 2018/052311 describes an improvement for protecting steel fluid lines of an umbilical from corrosion. WO 2016/061235 proposes reinforcement of a metallic tube of an umbilical with carbon-fibre composites. In WO 2018/148718, a weld zone of a tube is reinforced by expanding the tube. US 2015/361728 describes a method of cold forming a joining section for subsea pipes through rotary action, while WO 2015/200325 discloses a method of making a tube by flow-forming a hollow cylindrical pre-form.

FIG. 1 shows a conventional integrated subsea umbilical 10 in cross-section. The umbilical 10 contains a bundle of multiple elongate functional elements including cables and fluid conduits, held together by a transverse spacer structure 12 within a tubular polymer jacket 14. Although not shown in this schematic view, the jacket may comprise inner and outer sheaths with one or more armour layers of steel wire disposed between the sheaths.

Power cables 16, also known as power cores, typically supply three-phase AC electrical power along the umbilical 10 at high voltage. The functional elements of the umbilical 10 further comprise electrical signal cables 18, an optical fibre cable 20 and reinforcing elements 22 such as wires, ropes or rods of steel or carbon.

The fluid conduits of the umbilical 10, also known as fluid cores or fluid lines, comprise elongate pipes or tubes 24 that transport service fluids under pressure. The tubes 24 may be made of carbon steel but are more usually made of corrosion-resistant alloys such as duplex or super-duplex stainless steel. The tubes 24 have a small internal diameter, typically of less than two inches (50.8 mm), but may be tens or hundreds of metres long.

The fluid conduits also comprise tubular steel fittings 26, as exemplified in FIGS. 2 and 3, which are welded in series to, and are in fluid communication with, the steel tubes 24. Such fittings 26 are required to make connections at the ends of the conduit and may also be required at one or more intermediate positions along the length of the conduit. The example of such an intermediate fitting 26 shown in FIGS. 2 and 3 is a transition piece that effects fluid communication between tubes 24 of different inner and/or outer diameters and/or of different wall thicknesses. The fitting 26 is rotationally symmetrical about a central longitudinal axis 28 and comprises a wide end portion 26A opposed to a narrow end portion 26B. A circumferential frusta-conical step or shoulder 30 defines the boundary between the end portions 26A, 26B and effects the change of diameter between them.

FIG. 3 shows the wide end portion 26A of the fitting 26 attached by a circumferential butt weld 32 to a larger tube 24A of a fluid conduit and the narrow end portion 26B of the fitting 26 attached by another, similar weld 32 to a smaller tube 24B of the fluid conduit, all aligned on the central longitudinal axis 28. Consequently, the larger tube 24A, the fitting 26 and the smaller tube 24B are disposed in series and in fluid communication with each other.

Conventionally, fittings used in the fluid conduits of an umbilical are manufactured by forging. Compliance with standards such as ASTM (American Society for Testing and Materials) Standard Specification A815 requires such fittings to be welded to tubing of the same material grade. However, the process of forging leaves a fitting with lesser mechanical properties than the tubing to which the fitting is to be welded.

In this respect, the inventors have observed that umbilical bundle design exploits enhanced yield strength values guaranteed by manufacturers of wrought tubing. However, similar properties are not guaranteed by manufacturers of corresponding fittings that are to be welded to such tubing.

In particular, tubing manufacturers guarantee a Specified Minimum Yield Strength (SMYS) that is greater than the industry-standard SMYS for the same material grade. The SMYS is an indication of the minimum stress that will cause permanent plastic deformation. Fittings of the same material grade produced by other manufacturers may have an SMYS that is approximately 100 MPa lower than the SMYS of the corresponding tubing.

The conventional solution to this problem is to over-engineer forged fittings and to increase all tubing wall thicknesses to compensate for lower yield strengths of the fittings. This approach makes the fluid conduits of umbilicals needlessly bulky and expensive.

Against this background, the invention provides a method of making a fluid conduit, which conduit comprises at least one tubular metal fitting in fluid communication with metal tubing. The fluid conduit is apt to be incorporated into a subsea umbilical during assembly of the umbilical.

The method of the invention comprises: cold-forming a workpiece in a spinning operation to make the fitting, the material of the workpiece initially having a yield strength below that of the material of the tubing; increasing the yield strength of the material of the workpiece by virtue of the spinning operation that forms the fitting from the workpiece; and welding the fitting to the tubing. The materials of the fitting and the tubing are therefore compatible for welding to each other, for example being of the same grade.

To increase ductility, the workpiece may be heated to perform cold-forming at an elevated temperature that is above ambient but below the recrystallisation temperature of the material of the workpiece. The fitting may also be heat-treated, for example by annealing or stress-relieving, before being welded to the tubing.

The workpiece may be forged or otherwise wrought, for example in the form of a plate or a hollow bar, before being cold-formed in the spinning operation.

The workpiece may suitably be cold-formed around a spinning mandrel, preferably using a spinning forming tool.

In one sense, the principle of the invention may be expressed as correcting or reducing a mismatch between the yield strength of the material of the tubing and the initial yield strength of the material of the workpiece. In that case, the method may comprise assessing the yield strength of the material of the tubing and assessing the increased yield strength of the material of the workpiece by virtue of the spinning operation. The increased yield strength of the material of the workpiece may then be compared with the yield strength of the material of the tubing, before the fitting is welded to the tubing.

The material of the fitting may be re-certified in accordance with applicable standards, such as ASTM A815, ASTM A815/A815M—18 or other current revision, before welding the fitting to the tubing.

The inventive concept embraces a subsea fluid conduit that comprises at least one tubular cold-spun metal fitting welded to metal tubing in mutual fluid communication, the fitting and the tubing being of materials of mutually-compatible grades. The inventive concept also extends to a subsea umbilical comprising at least one fluid conduit of the invention.

The materials of the fitting and the tubing may have substantially identical yield strengths. The tubing may be highly elongate, for example with an inner diameter of up to two inches (50.8 mm) and a length of at least 100 metres.

Thus, the invention takes the beneficial approach of reducing unnecessary material by adding a reinforcement step that involves spinning the fitting. Spinning has the advantage of improving certain mechanical properties of the fitting, especially its yield strength.

Preferred embodiments of the invention use a metal spinning technique to enhance the mechanical properties of duplex or super duplex stainless steel material grades. The metallurgy of duplex or super duplex grades makes cold-working from the spinning process both feasible and beneficial. The invention therefore proposes manufacturing techniques for fittings that involve cold working instead of a hot forging process.

Duplex steels have a two-phase microstructure that comprises a mixture of austenitic and ferritic steels. Their enhanced yield strength allows thinner sections and significant weight savings. Super duplex steels share these benefits but have a higher chromium and molybdenum content, which provides increased corrosion resistance.

Advantageously, cold-forming a metal during a spinning operation achieves a work-hardening effect. As work hardening reduces as the working temperature of the material increases, hot spinning is not a preferred option. Nevertheless, it may be desirable to increase the temperature of the workpiece slightly to achieve a desired level of plasticity and ductility without tearing the material. Subsequent solution annealing heat treatment may also be required on assessment of the cold-formed condition. However, the process of shaping the workpiece is still regarded and governed as a cold-forming operation.

Various spinning tools may be used, such as a half-spherical hardened steel roller mounted on bearings to reduce friction with the workpiece.

The invention lends itself to a repeatable process, which could be automated, to ensure that process variables are controlled and that guaranteed quality can be achieved, leading to the definition of a batch and batch-testing requirements.

By virtue of the invention, material in the form of a plate or a bored forged bar can be spun into a tubular form to work-harden and thereby to improve the yield and tensile properties of the material. Such spun items may, for example, define control tubing fittings, such as transition pieces between tubes of different wall thickness and/or diameter.

Embodiments of the invention implement a method to correct or reduce a mismatch of strength between metal tubing and a metal fitting. The method comprises the following steps: assessing the SMYS and material grade of the tubing; providing a base material for the fitting of a compatible material grade to the tubing; pre-forming the base material into an initial piece; cold-spinning the initial piece to reshape the fitting while improving or enhancing properties of the fitting material; re-certifying the fitting material in accordance with national or international standards; and welding the fitting to the tubing.

The metal of the tubing and the fitting may be selected from the following group: steels; steel alloys, such as duplex, super duplex or Inconel; duplex and super-duplex stainless steels; and work-hardenable steels and steel alloys.

The initial piece may, for example, be a plate or a hollow bar. The initial piece is apt to be wrought, preferably by being forged.

In summary, the invention provides a method of making a fluid conduit that comprises at least one tubular metal fitting in fluid communication with metal tubing. The conduit is particularly apt to be incorporated into a subsea umbilical, which is the source of the technical problem and therefore also falls within the inventive concept.

The fitting is made by cold-forming a workpiece in a spinning operation. The workpiece material initially has a yield strength below that of the tubing material. The invention corrects or reduces this mismatch between the yield strength of the tubing material and the initial yield strength of the workpiece material by: assessing the yield strength of the tubing material; assessing the increased yield strength of the workpiece material by virtue of the spinning operation; and before welding the fitting to the tubing, comparing the increased yield strength of the workpiece material with the yield strength of the tubing material.

To put the invention into context, reference has already been made to FIGS. 1 to 3 of the accompanying drawings, in which.

Figure 4:
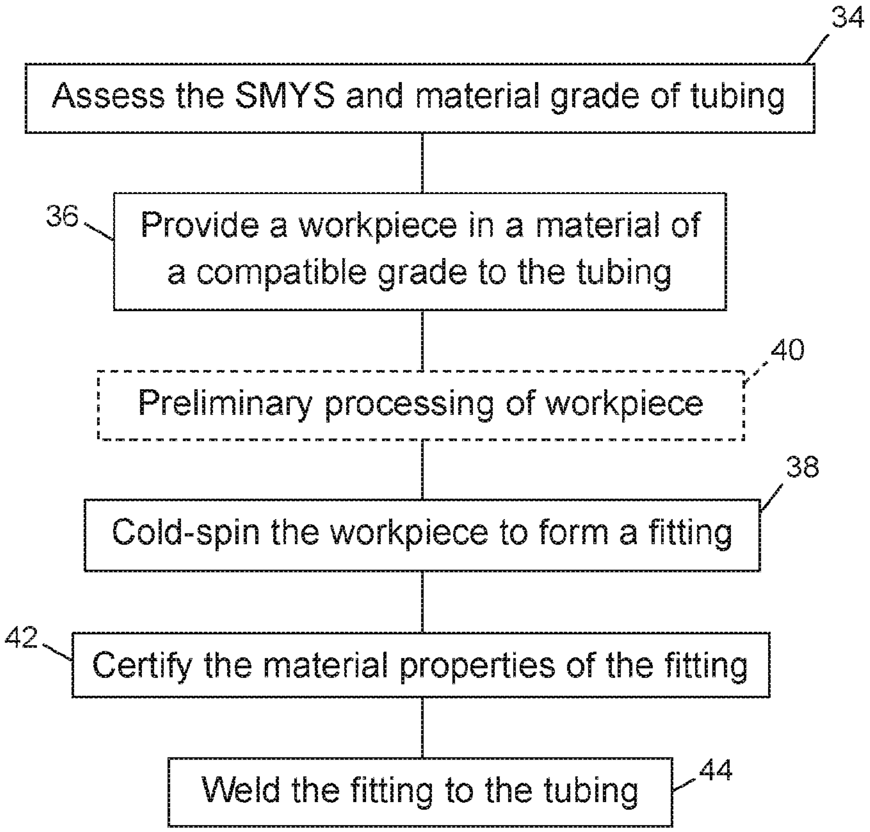
Figure 5A:
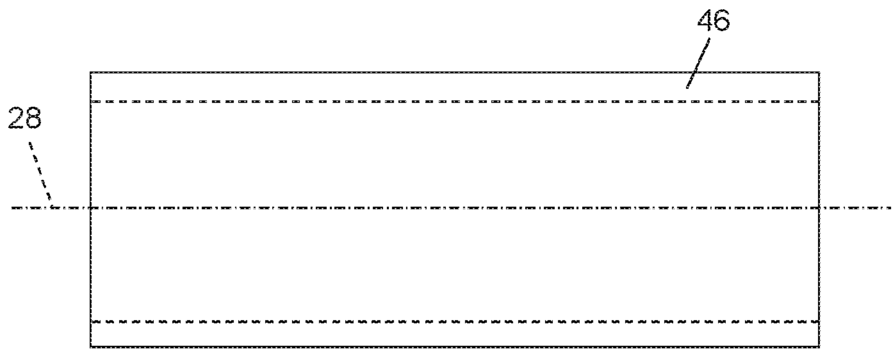
Figure 5B:
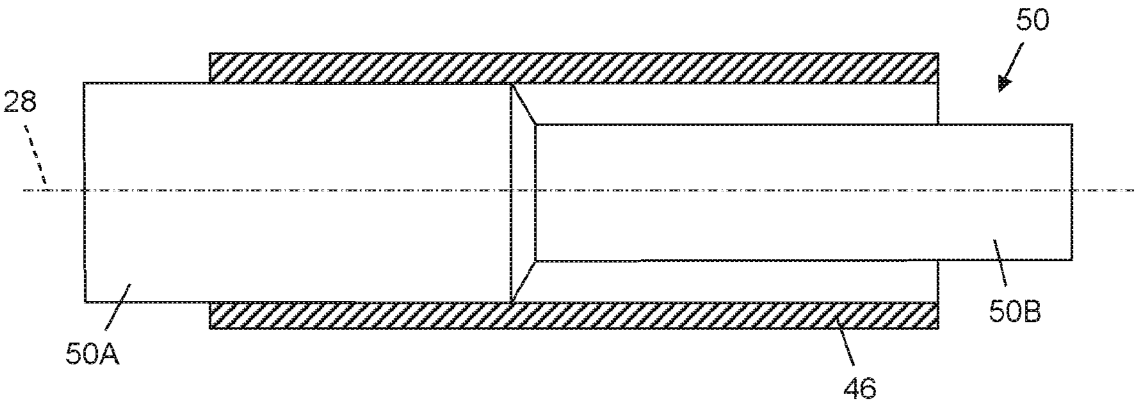
Figure 5C:
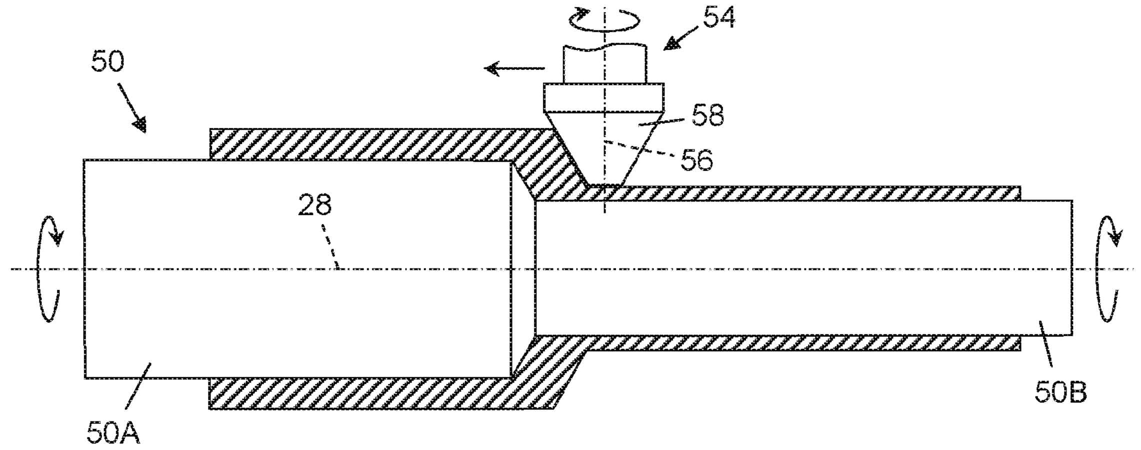
Figure 5D:
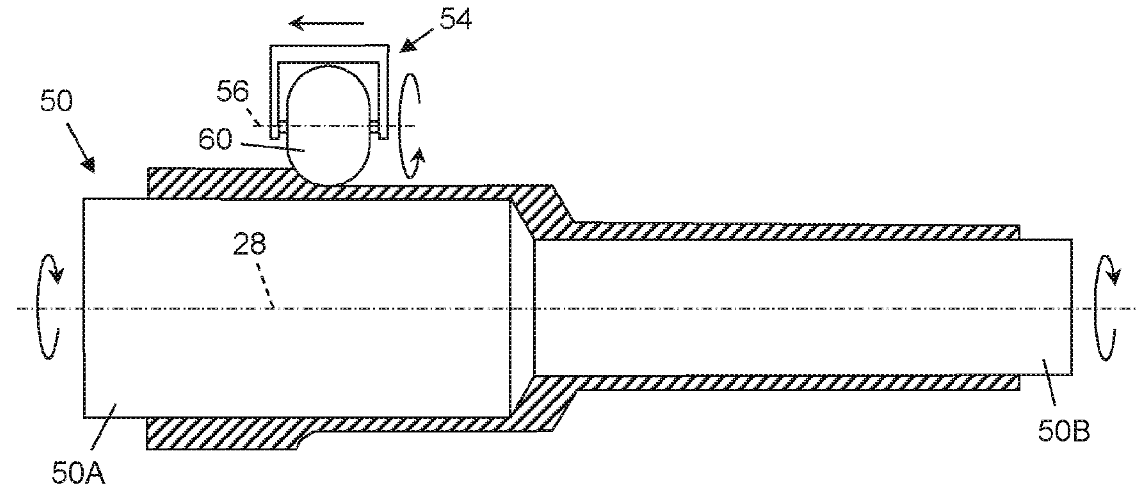
Figure 6A:
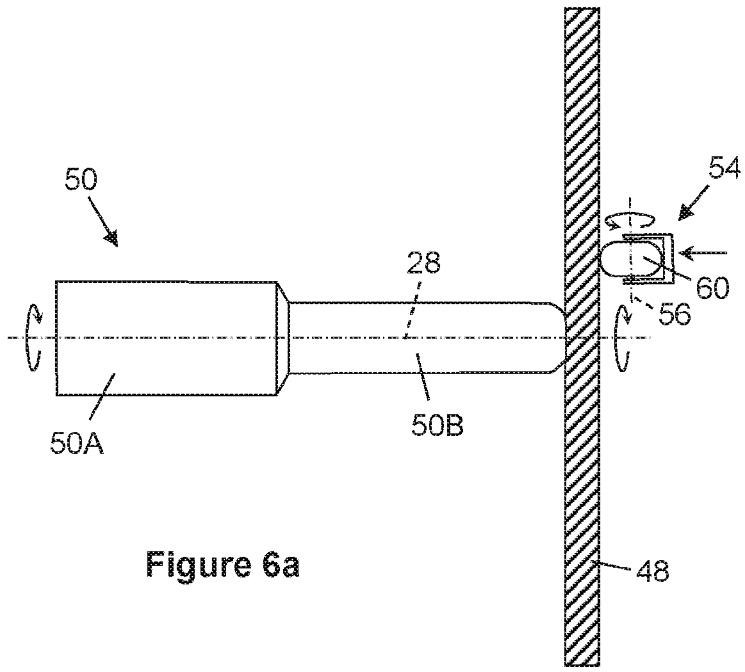
Figure 6B:
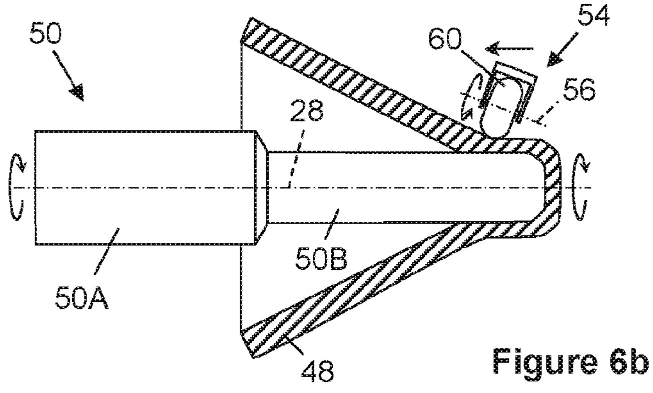
Figure 6C:
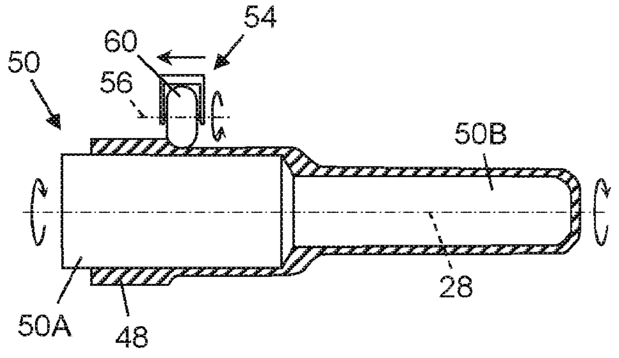

In order that the invention may be more readily understood, reference will now be made, by way of example, to the remainder of the accompanying drawings in which:

FIG. 4 is a flow diagram illustrating a method of the invention;

FIG. 5*a* is a schematic side view of a tubular workpiece for cold-forming into the fitting;

FIG. 5*b* is a schematic sectional side view that shows the workpiece of FIG. 5*a* surrounding a mandrel;

FIGS. 5*c* and 5*d* correspond to FIG. 5*b* but show the workpiece being cold-formed around the mandrel during a spinning operation; and FIGS. 6*a* to 6*c* are a sequence of schematic sectional side views that show a workpiece initially in the form of a disc or plate being cold-formed around a mandrel in a spinning operation.

Turning next, then, to FIG. 4, this flow diagram shows that the method of the invention comprises the preliminary steps of assessing the SMYS and material grade of tubing at 34 and then, at 36, providing a workpiece in a material of a grade that is compatible with the grade of the tubing.

In this context, compatibility between the material grades of the tubing and the workpiece requires those grades to be approved for welding a component of one material to a component of the other material when fabricating an assembly for use in the technical application required. For example, compatibility may be determined by industry standards such as the aforementioned ASTM A815, which applies to wrought piping fittings of ferritic, ferritic/austenitic and martensitic stainless steel as used in subsea umbilicals.

In some such cases, compatibility may require the material grades to be the same, or at least substantially the same. This is accepted to be the case when manufacturing fluid conduits for use in the subsea oil and gas industry, like those used in umbilicals. However, in a broad sense, compatibility does not necessarily preclude the material grades being different, provided that the applicable standards deem them to be compatible for welding components to each other for the technical application in question.

Once a suitable material grade has been selected for the workpiece at step 36, the workpiece is shaped by cold-spinning at step 38 to form a desired tubular fitting.

Between steps 36 and 38, the workpiece may also be subjected to an optional intermediate step of preliminary processing at 40 to prepare the workpiece for cold-spinning. For example, a cylindrical round bar could be bored longitudinally to make a workpiece in the form of a tube, or a plate could be cut to make a workpiece that is initially in the form of a circular disc.

In an intermediate preliminary processing step 40, the mechanical properties of the workpiece may also be checked and if necessary modified to facilitate cold-spinning, for example by heating the workpiece to improve its flexibility and ductility but not to a temperature that departs from the cold-forming domain. In this respect, cold working or cold forming effects plastic deformation of a metal below its recrystallisation temperature, in contrast to hot working or hot forming which effects plastic deformation of a metal above its recrystallisation temperature. The recrystallisation temperature for steels is typically between 400° C. and 700° C. but tends to be higher for stainless steels.

As the workpiece is cold-spun to form the fitting in step 38, the material of the workpiece undergoes work-hardening and therefore its mechanical properties will change from its initial state. The resulting mechanical properties are certified at step 42 to ensure that the fitting is suitable for its intended purpose, for example to ensure that work-hardening has increased the yield strength of the material to an extent that compensates for a beneficial reduction in the wall thickness of the fitting. Potentially, an additional treatment step such as annealing or other heat treatment such as stress-relieving may be required to adjust the properties of the cold-formed material before certification of the fitting at step 42.

Finally, once certified, the fitting is welded to the tubing at step 44.

Figure 1:
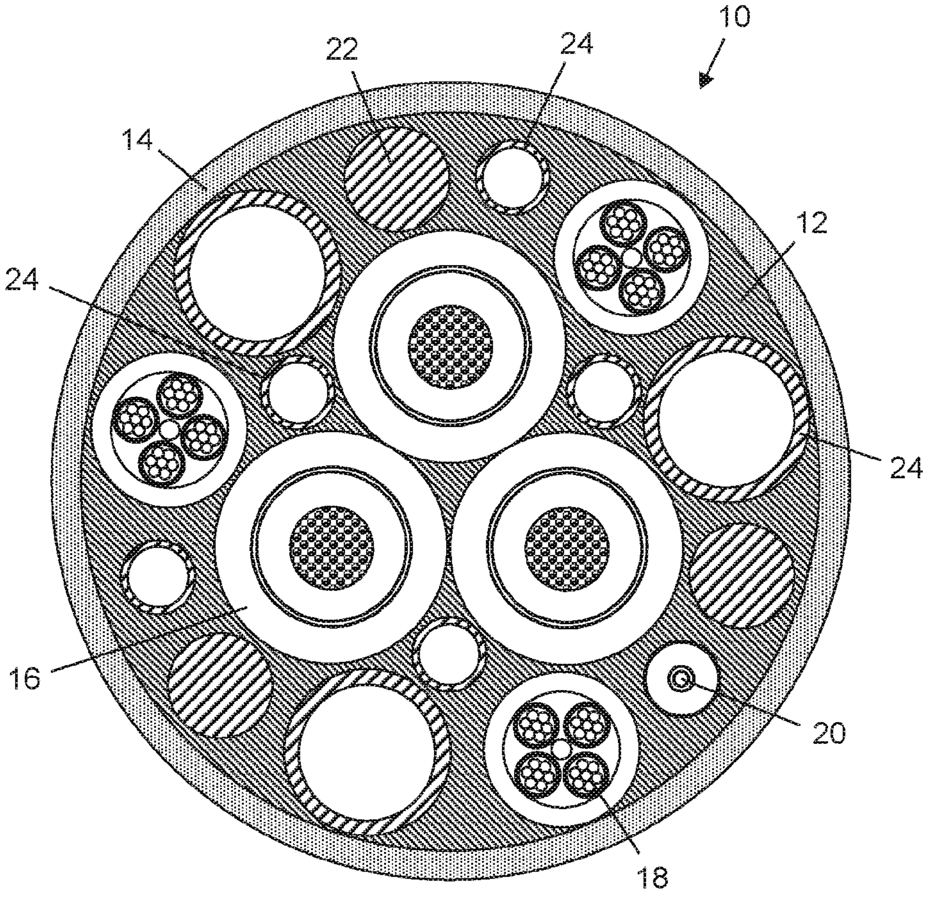
Figure 1 PRIOR ART
FIG. 1 is a schematic cross-sectional view through a subsea umbilical.
Figure 2:
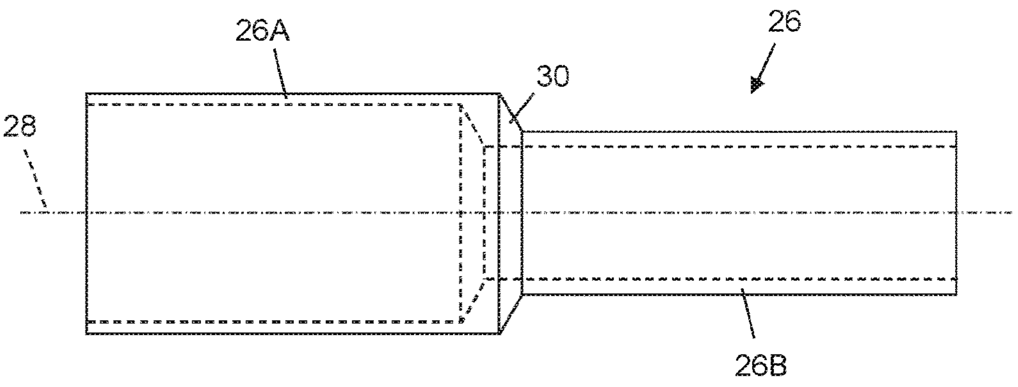
FIG. 2 is a schematic side view of a fitting for a fluid conduit of the umbilical shown in FIG. 1.
Figure 3:
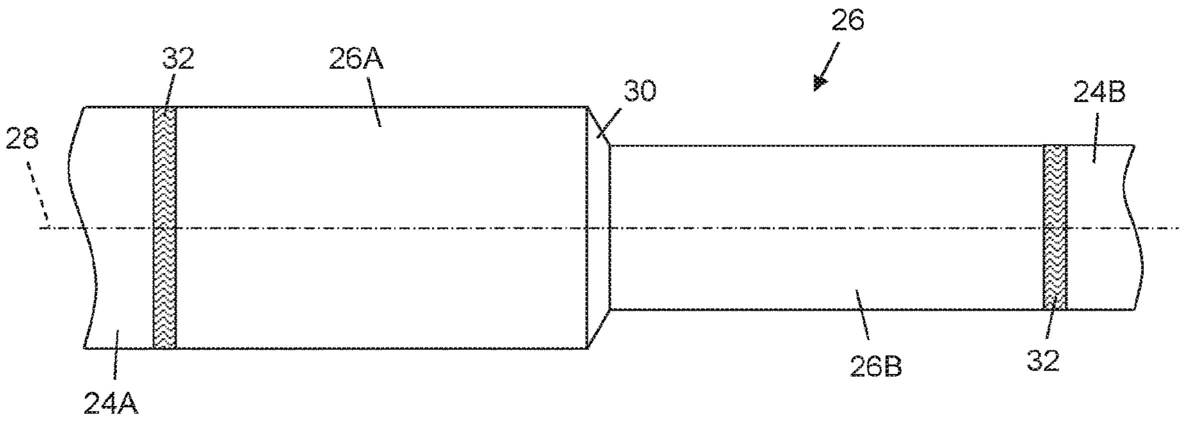
FIG. 3 is a schematic side view of the fitting welded between pipes of the conduit.

FIGS. 5*a* to 5*d* and FIGS. 6*a* to 6*c* exemplify how the fitting 26 shown in FIGS. 2 and 3 may be cold-formed from a workpiece in a spinning operation. In FIG. 5*a*, the workpiece is a tube 46 that is preferably a bored round bar but could, in principle, be formed into a tubular shape by other known techniques such as extrusion. Conversely, in FIG. 6*a*, the workpiece 48 is initially a circular disc that is cut from a flat plate.

FIG. 5*b* shows the tube 46 surrounding an internal mandrel 50 that has been inserted into the central lumen of the tube 46. The mandrel 50 is longer than the tube and so protrudes longitudinally beyond the opposed open ends of the tube 46.

The circumferentially-stepped outer surface of the mandrel 50 reflects the correspondingly-stepped shape of the fitting 26 and determines the internal contour of the fitting 26. Thus, the mandrel 50 is rotationally symmetrical about a central longitudinal axis 28 and comprises a wide end portion 50A opposed to a narrow end portion 50B. A circumferential frusto-conical step or shoulder 52 defines the boundary between the end portions 50A, 50B of the mandrel 50 and effects the change of diameter between them. The wide end portion 50A of the mandrel 50 is a close sliding or interference fit within the surrounding tube 46.

Advantageously, the smooth outer surface of the mandrel 50 produces a correspondingly smooth internal surface finish within the fitting 26, hence promoting fluid flow through the fitting 26 and reducing deposition of solids on the interior of the fitting 26 in use.

FIGS. 5*c* and 5*d* show the tube 46 being cold-formed around the mandrel 50 during the spinning operation. In each case, the mandrel 50 and the tube 46 are spun together about the central longitudinal axis 28 while a forming tool 54 is pressed radially inwardly against the exterior of the tube 46 and advanced longitudinally, parallel to the central longitudinal axis 28. In this way, the wall of the tube 46 is progressively squeezed and cold-formed between the forming tool 54 and the mandrel 50, becoming radially thinner in the process.

FIG. 5*c* shows a first stage of the spinning operation, in which the narrow end portion 26B of the fitting 26 is being formed as a forming tool 54 presses the tube 46 radially inwardly against the narrow end portion 50B of the mandrel 50. Conversely, FIG. 5*d* shows a second stage of the spinning operation, in which the wide end portion 26A of the fitting 26 is being formed as a forming tool 54 presses the tube 46 radially inwardly against the wide end portion 50A of the mandrel 50.

In principle, the same forming tool 54 could be used for both stages of the spinning operation. However, to show another possibility, FIGS. 5*c* and 5*d* show different forming tools 54 being used at each stage.

The forming tool 54 shown in FIG. 5*c* turns about a spin axis 56 that intersects the central longitudinal axis 28 orthogonally. The forming tool 54 shown here comprises a frusta-conical head 58 that is rotationally symmetrical about the spin axis 56 and that tapers toward the mandrel 50. The taper angle of the head 58 determines, and hence substantially matches, the inclination of the shoulder 30 of the fitting 26.

In contrast, the forming tool 54 shown in FIG. 5*d* turns about a spin axis 56 that is parallel to the central longitudinal axis 28. The forming tool 54 shown here comprises a roller 60 in the shape of an oblate spheroid that is rotationally symmetrical about the spin axis 56.

It will be evident from FIGS. 5*c* and 5*d* that the squeezed, radially-thinned wall of the tube 46 elongates longitudinally and hence stretches along the mandrel 50, eventually lengthening the tube 46 to exceed the desired length of the fitting 26. The excess length of the fitting 26 is subsequently cut away and the ends of the fitting 26 are faced and chamfered to prepare the fitting 26 to be welded to respective tubes 24A, 24B as shown in FIG. 3.

Turning finally to FIGS. 6*a* to 6*c*, these drawings show how a fitting 26 may instead be cold-spun from a workpiece 48 that is initially in the form of a circular disc. FIGS. 6*a* to 6*c* also show a forming tool 54 that bears against the workpiece 48 to impart the eventual shape of the fitting 26 as the workpiece 48 is sandwiched between the forming tool 54 and the mandrel 50.

FIG. 6*a* shows the workpiece 48 in its initial flat disc shape, in a plane orthogonal to the central longitudinal axis 28, fixed to the narrow end of the mandrel 50 and also rotationally symmetrical about the central longitudinal axis 28. Again, the workpiece 48 spins with the mandrel 50 about the central longitudinal axis 28. During the spinning operation, the forming tool 54 deforms and collapses the workpiece 48 onto and along the mandrel 50 from a planar initial state of the workpiece 48 shown in FIG. 6*a* through a frusto-conical dished intermediate state shown in FIG. 6*b* to a tubular state substantially conforming to the shape of the mandrel 50 as shown in FIG. 6*c*.

FIG. 6*b* shows a first stage of the spinning operation, in which the narrow end portion 26B of the fitting 26 is being formed as the forming tool 54 presses the workpiece 48 radially inwardly against the narrow end portion 50B of the mandrel 50. Conversely, FIG. 6*c* shows a second stage of the spinning operation, in which the wide end portion 26A of the fitting 26 is being formed as the forming tool 54 presses the workpiece 48 radially inwardly against the wide end portion 50A of the mandrel 50.

The forming tool 54 exemplified in FIGS. 6*a* to 6*c* is like that shown in FIG. 5*d*. Thus, the forming tool 54 comprises an oblate spheroidal roller 60 that is rotationally symmetrical about a spin axis 56. In this case, however, the spin axis 56 is kept generally parallel to the part of the workpiece 48 contacted by the roller 60 and hence pivots during the spinning operation as the workpiece 48 deforms and collapses onto the mandrel 50.

Once the workpiece 48 is fully formed, the closed end of the workpiece 48 that surrounds the narrow end of the mandrel 50 is cut away to form an open-ended fitting 26 like that shown in FIG. 2.

In all embodiments, the spin axis 56 of the forming tool 54 is suitably coplanar with the central longitudinal axis 28 about which the workpiece rotates during the spinning operation.

Many variations are possible within the inventive concept. For example, the workpiece could be formed during spinning by pressing radially outwardly within an external female die rather than by pressing radially inwardly around an internal male mandrel.

A forming tool used in the invention preferably turns about a spin axis to reduce friction but, in principle, forming tools could be non-rotating, hence being in sliding contact with a suitably-lubricated rotating workpiece.

The invention claimed is:

1. A method of making a fluid conduit that comprises at least one tubular metal fitting in fluid communication with wrought metal tubing, the method comprising:

providing a metal workpiece that has been forged and cold-forming the forged metal workpiece in a spinning operation to make the tubular metal fitting, the material of the forged metal workpiece initially having a yield strength below that of the material of the wrought metal tubing;

increasing the yield strength of the forged metal workpiece by virtue of the spinning operation that forms the tubular metal fitting from the forged metal workpiece; and welding the tubular metal fitting to the wrought metal tubing and producing the fluid conduit.

2. The method of claim 1, comprising performing the cold forming of the forged metal workpiece at an above ambient temperature below the recrystallisation temperature of the material of the forged metal workpiece.

3. The method of claim 1, comprising annealing or stress relieving the tubular metal fitting before the welding.

4. The method of claim 1, comprising providing the forged metal workpiece as a plate or a hollow bar before the cold forming in the spinning operation.

5. The method of claim 1, comprising performing the cold forming of the forged metal workpiece around a spinning mandrel.

6. The method of claim 1, comprising performing the cold forming of the forged metal workpiece with a spinning forming tool.

7. The method of claim 1, comprising correcting or reducing a mismatch between the yield strength of the material of the wrought metal tubing and the initial yield strength of the material of the forged metal workpiece.

8. The method of claim 1, comprising:

assessing the yield strength of the material of the wrought metal tubing; and assessing the increased yield strength of the material of the forged metal workpiece by virtue of the spinning operation.

9. The method of claim 8, comprising comparing the increased yield strength of the material of the forged metal workpiece with the yield strength of the material of the wrought metal tubing, before the welding.

10. The method of claim 1, comprising certifying mechanical properties of the tubular metal fitting after the cold-forming of the forged metal workpiece in the spinning operation, before the welding.

11. The method of claim 10, comprising certifying the mechanical properties of the tubular metal fitting in accordance with American Society for Testing and Materials (ASTM) standard specification A815.

12. The method of claim 1, comprising incorporating the fluid conduit into a subsea umbilical during assembly of the umbilical.

13. The method of claim 1, wherein the metal of the wrought metal tubing and of the tubular metal fitting are selected from the following group: steels; steel alloys, such as duplex, super duplex or Inconel; duplex and super duplex stainless steels; and work-hardenable steels and steel alloys.

* * * * *